United States Patent
Ohta et al.

(10) Patent No.: US 10,193,184 B2
(45) Date of Patent: Jan. 29, 2019

(54) LITHIUM ION SECONDARY BATTERY AND METHOD FOR MANUFACTURING SAME

(71) Applicant: NEC ENERGY DEVICES, LTD., Sagamihara-shi, Kanagawa (JP)

(72) Inventors: Tomoyuki Ohta, Kanagawa (JP); Ryota Yanagisawa, Kanagawa (JP); Takayuki Suzuki, Kanagawa (JP)

(73) Assignee: NEC ENERGY DEVICES, LTD., Sagamihara-shi, Kanagawa (JP)

( * ) Notice: Subject to any disclaimer, the term of this patent is extended or adjusted under 35 U.S.C. 154(b) by 0 days.

(21) Appl. No.: 15/506,573

(22) PCT Filed: Sep. 4, 2015

(86) PCT No.: PCT/JP2015/075162
§ 371 (c)(1),
(2) Date: Feb. 24, 2017

(87) PCT Pub. No.: WO2016/052074
PCT Pub. Date: Apr. 7, 2016

(65) Prior Publication Data
US 2017/0279153 A1  Sep. 28, 2017

(30) Foreign Application Priority Data

Sep. 30, 2014  (JP) .................................. 2014-199839
Nov. 18, 2014  (JP) .................................. 2014-233944

(51) Int. Cl.
*H01M 10/0525*   (2010.01)
*H01M 10/0566*   (2010.01)
(Continued)

(52) U.S. Cl.
CPC ..... *H01M 10/0525* (2013.01); *H01M 2/0275* (2013.01); *H01M 2/361* (2013.01);
(Continued)

(58) Field of Classification Search
CPC .. H01M 10/0525; H01M 2/0275; H01M 4/04; H01M 10/0566; H01M 10/058; H01M 10/4214
See application file for complete search history.

(56) References Cited

U.S. PATENT DOCUMENTS 5,496,661 A     3/1996  Mao
6,461,757 B1 *  10/2002 Sasayama ........... H01M 2/0275
                                                  429/127
(Continued)

FOREIGN PATENT DOCUMENTS

CN  102668222 A  9/2012
CN  202678453 U  1/2013
(Continued)

OTHER PUBLICATIONS

International Search Report of PCT/JP2015/075162, dated Oct. 13, 2015. [PCT/ISA/210].
(Continued)

*Primary Examiner* — Helen Oi K Conley
(74) *Attorney, Agent, or Firm* — Sughrue Mion, PLLC (57) ABSTRACT

A method for manufacturing a lithium ion secondary battery, the lithium ion secondary battery including a positive electrode and a negative electrode disposed with a separator sandwiched therebetween and contained together with an electrolytic solution in an outer case including a flexible film, wherein the quantity of dissolved nitrogen in the electrolytic solution in injecting the electrolytic solution into the outer case is 100 μg/mL or less.

10 Claims, 3 Drawing Sheets (51) Int. Cl.
*H01M 10/058* (2010.01)
*H01M 2/02* (2006.01)
*H01M 4/04* (2006.01)
*H01M 10/42* (2006.01)
*H01M 2/36* (2006.01)
*H01M 4/02* (2006.01)

(52) U.S. Cl.
CPC ........... *H01M 4/04* (2013.01); *H01M 10/058* (2013.01); *H01M 10/0566* (2013.01); *H01M 10/4214* (2013.01); *H01M 2004/027* (2013.01); *H01M 2004/028* (2013.01); *Y02E 60/122* (2013.01); *Y02P 70/54* (2015.11); *Y02T 10/7011* (2013.01)

(56) References Cited

U.S. PATENT DOCUMENTS

| | | |
|---|---|---|
| 8,814,955 B2 | 8/2014 | Kumeuchi et al. |
| 2002/0064712 A1 | 5/2002 | Sekino et al. |
| 2002/0086216 A1 | 7/2002 | Sekino et al. |
| 2007/0134558 A1 | 6/2007 | Fukunaga et al. |
| 2009/0191457 A1 | 7/2009 | Sano |
| 2014/0162117 A1 | 6/2014 | Matsuno et al. |

FOREIGN PATENT DOCUMENTS

| | | |
|---|---|---|
| CN | 103490036 A | 1/2014 |
| CN | 103872381 A | 6/2014 |
| EP | 2 503 634 A1 | 9/2012 |
| JP | 59-18580 A | 1/1984 |
| JP | 7-85889 A | 3/1995 |
| JP | 7-249431 A | 9/1995 |
| JP | 2002-184462 A | 6/2002 |
| JP | 2007-165111 A | 6/2007 |
| JP | 2007-328952 A | 12/2007 |
| JP | 2008-91065 A | 4/2008 |
| JP | 2013-45759 A | 3/2013 |
| JP | 2013-58377 A | 3/2013 |
| JP | 2013-164915 A | 8/2013 |

OTHER PUBLICATIONS

Extended European Search Report dated Mar. 12, 2018 issued by the European Patent Office in counterpart application No. 15846532.8.

Communication dated Nov. 15, 2018, from the State Intellectual Property Office of People's Republic of China in counterpart Application No. 201580052451.2.

* cited by examiner

LITHIUM ION SECONDARY BATTERY AND METHOD FOR MANUFACTURING SAME

CROSS REFERENCE TO RELATED APPLICATIONS

This application is a National Stage of International Application No. PCT/JP2015/075162 filed Sep. 4, 2015, claiming priorities based on Japanese Patent Application Nos. 2014-199839 filed Sep. 30, 2014 and 2014-233944 filed Nov. 18, 2014, the contents of all of which are incorporated herein by reference in their entirety.

TECHNICAL FIELD

The present invention relates to a lithium ion secondary battery and a method for manufacturing the same.

BACKGROUND ART

Secondary batteries are widely used as a power source for portable devices such as cellular phones, digital cameras, and laptop computers, and are becoming common as a power source for vehicles and household use in recent years. Especially, lithium ion secondary batteries, which have high energy density and are lightweight, have become an energy storage device essential for life.

A lithium ion secondary battery has a structure in which a positive electrode sheet and a negative electrode sheet as electrode elements are separated by a separator. Each of the positive electrode sheet and the negative electrode sheet includes a portion with an electrode coating, formed by applying a combined agent containing an active material, a binder, and a conductive aid, etc., onto a current collector, and a portion with no electrode coating, onto which a combined agent has not been applied to be connected to an electrode terminal. These are contained together with an electrolytic solution in an outer case and the outer case is sealed. A positive electrode terminal and a negative electrode terminal are electrically connected at one end to the portion with no electrode coating of the positive electrode sheet and the portion with no electrode coating of the negative electrode sheet, respectively, and the other ends of the positive electrode terminal and the negative electrode terminal are extracted to the outside of the outer case.

For the outer case, flexible films including an aluminum sheet or the like with a thickness of tens to hundreds microns are frequently employed as a means for weight saving for a battery. Although flexible films are excellently lightweight, it is disadvantageous that they have strength lower than metal can cases with a large thickness and are vulnerable to an impact from the outside, and in addition the outer case swells significantly when a gas is generated from the battery element or electrolytic solution contained in the container.

Accordingly, techniques to remove $NH_3$ or $H_2$ present in an electrolytic solution in a step of manufacturing an electrolytic solution have been proposed.

For example, Patent Literature 1 describes removal of a residual impurity (an unreacted material and a by-product) in a method for manufacturing an electrolytic solution containing $LiPF_6$, and discloses that, in the case that the residual impurity is a volatile substance or a gas, the impurity is removed through flowing an inert gas or vacuum treatment.

CITATION LIST

Patent Literature

Patent Literature 1: JP7-85889A

SUMMARY OF INVENTION

Technical Problem

If a technique to remove an impurity is used in a step of manufacturing an electrolytic solution, as described in Patent Literature 1, impurities such as $NH_3$ and $H_2$ in an electrolytic solution can be temporarily removed. However, moisture, nitrogen, carbon dioxide, or the like in a gas contacting with an electrolytic solution thus obtained dissolves in the electrolytic solution before injecting the electrolytic solution into a battery. Thus, it was difficult to prevent the occurrence of problems such as the swelling of a battery due to an impurity in an electrolytic solution only by removal of an impurity in a step of manufacturing an electrolytic solution.

In transporting an electrolytic solution contained in a container, the container is typically filled with nitrogen gas to prevent moisture contamination, and particularly in this case, a large amount of nitrogen disadvantageously dissolves in the electrolytic solution. If an electrolytic solution containing dissolved nitrogen is used in manufacturing a battery, the dissolved nitrogen becomes into bubbles to cause the cell to swell in high temperature aging, and lowering of safety is expected to be caused. When the electrodes are vacuum-impregnated with an electrolytic solution after injection into a cell, the dissolved nitrogen to generate bubbles in the electrolytic solution by degassing, and the bubbles may attach to a sealing portion to degrade the sealing properties.

An object of the present invention is to provide a lithium ion secondary battery to solve the above problems, and a method for manufacturing the lithium ion secondary battery.

Solution to Problem

A method for manufacturing a lithium ion secondary battery according to one aspect of the present invention is a method for manufacturing a lithium ion secondary battery, the lithium ion secondary battery including a positive electrode and a negative electrode disposed with a separator sandwiched therebetween and contained together with an electrolytic solution in an outer case including a flexible film, wherein the quantity of dissolved nitrogen in the electrolytic solution in injecting the electrolytic solution into the outer case is 100 μg/mL or less.

A lithium ion secondary battery according to another aspect of the present invention is a lithium ion secondary battery including a positive electrode and a negative electrode disposed with a separator sandwiched therebetween and contained together with an electrolytic solution in an outer case including a flexible film, wherein the quantity of dissolved nitrogen in the electrolytic solution is 100 μg/mL or less.

Advantageous Effects of Invention

The present invention enables effective suppression of the swelling of a battery at a high temperature through setting the quantity of dissolved nitrogen in an electrolytic solution to a predetermined quantity or less; and prevention of bubble generation in an electrolytic solution to improve sealing properties in vacuum-impregnating electrodes with an electrolytic solution after injecting the electrolytic solution into a cell in manufacture of a lithium ion secondary battery.

DESCRIPTION OF EMBODIMENTS

A method for manufacturing a lithium ion secondary battery according to an exemplary embodiment is a method for manufacturing a lithium ion secondary battery, the lithium ion secondary battery including a positive electrode and a negative electrode disposed with a separator sandwiched therebetween and contained together with an electrolytic solution in an outer case including a flexible film, wherein the quantity of dissolved nitrogen in the electrolytic solution in injecting the electrolytic solution into the outer case is 100 µg/mL or less.

Such a manufacturing method enables effective suppression of the swelling of a resulting battery at a high temperature; and prevention of bubble generation in an electrolytic solution to improve sealing properties in vacuum-impregnating electrodes with an electrolytic solution after injecting the electrolytic solution into a cell in manufacture of a battery.

In the above manufacturing method, it is preferred to subject the electrolytic solution to decompression treatment (degas treatment) before injecting the electrolytic solution into the outer case so that the quantity of dissolved nitrogen in the electrolytic solution becomes 100 µg/mL or less, and inject the electrolytic solution after being subjected to the decompression treatment into the outer case.

Then, the less the quantity of dissolved nitrogen in the electrolytic solution in injecting the electrolytic solution into the outer case is, the more preferable in principle. However, the more vigorous the degassing step is, the more frequently other adverse factors may be caused. Specifically, too much vacuum degassing, which is preferred in that the quantity of dissolved nitrogen is decreased, allows the solvent to evaporate, nevertheless, and the concentration or composition of the electrolytic solution may change to increase the viscosity, and as a result the performance of a battery may be degraded. Accordingly, the quantity of dissolved nitrogen is preferably 5 µg/mL or more, and more preferably 10 µg/mL or more as a rough value.

Although it is desirable that the quantity of dissolved nitrogen in the electrolytic solution in injecting the electrolytic solution into the outer case is 100 µg/mL or less, the quantity is more preferably 80 µg/mL or less, and even more preferably 75 µg/mL or less from the viewpoint of achieving a more sufficient swelling-suppressing effect and foaming-preventing effect. The quantity of dissolved nitrogen may be set to 60 µg/mL or less, even to 50 µg/mL or less, and even to 40 µg/mL or less from the viewpoint of achieving a higher effect.

Thus, the quantity of dissolved oxygen in the electrolytic solution in a lithium ion secondary battery manufactured is preferably 100 µg/mL or less, more preferably 80 µg/mL or less, and even more preferably 75 µg/mL or less. From the viewpoint of achieving a higher effect, the quantity of dissolved oxygen may be set to 60 µg/mL or less, even to 50 µg/mL or less, and even to 40 µg/mL or less. From the viewpoint of ensuring a desired performance of a battery, the quantity of dissolved oxygen is preferably 5 µg/mL or more, and more preferably 10 µg/mL or more.

The decompression treatment may be performed, for example, in 1 to 5 cycles, preferably in 1 to 3 cycles each of which includes decompression and opening. In the case that much dissolved nitrogen is present in the electrolytic solution, it is preferred to perform the decompression treatment in a plurality of cycles, preferably in 2 to 5 cycles, more preferably in 2 to 3 cycles. The decompression treatment in a plurality of cycles enables reduction of decompression duration per cycle and efficient removal of dissolved nitrogen. If the decompression treatment is performed in too many cycles, the components of the electrolytic solution tend to evaporate, and thus the decompression treatment is preferably performed in 5 or fewer cycles, more preferably in 3 or fewer cycles.

The pressure in the decompression treatment may be set, for example, to −70 kPa to −99 kPa relative to the atmospheric pressure (a pressure lower than the atmospheric pressure by 70 to 99 kPa). If the degree of decompression is too low, dissolved nitrogen cannot be removed sufficiently; and if the degree of decompression is too high, the components of the electrolytic solution tend to evaporate. From the viewpoint of sufficient removal of dissolved nitrogen, the pressure is preferably −80 kPa to −99 kPa, and more preferably −90 kPa to −99 kPa.

The duration to maintain a predetermined state of decompression in the decompression treatment may be set, for example, to 10 minutes or shorter from the viewpoint of reduction of the evaporation of the components of the electrolytic solution and treatment efficiency, and the duration is preferably 5 minutes or shorter, and more preferably 2 minutes or shorter, and the duration is preferably 0.5 minutes or longer, and more preferably 1 minute or longer from the viewpoint of sufficient removal of dissolved nitrogen.

The decompression treatment may be performed at normal temperature, and may be set, for example, to 5 to 35° C., and may be performed preferably at 10 to 35° C., more preferably at 10 to 30° C. If the temperature of the electrolytic solution is low, less dissolved nitrogen is removed off; however, the evaporation of the components of the electrolytic solution can be reduced. If the temperature of the electrolytic solution is high, more dissolved nitrogen is removed off; however, the evaporation of the components of the electrolytic solution is promoted.

The quantity of the electrolytic solution to be treated in one decompression treatment may be set, for example, to 200 to 1000 mL, and may be appropriately set even to a quantity of 1000 mL or more in accordance with the scale or performance of a treatment apparatus.

The electrolytic solution after being subjected to the decompression treatment may be injected into the outer case, for example, in a dry air atmosphere (e.g., dew point: −40° C. or lower). A shorter period is preferred for the period from the termination of the decompression treatment to injection, although the period depends on the state of storage of the electrolytic solution after being subjected to the decompression treatment, from the viewpoint of preventing increase of the quantity of dissolved nitrogen, and the period is preferably 1 week or shorter, for example. The electrolytic solution after being subjected to the decompression treatment is preferably stored in a sealed container during the period before injection. The space other than the space for the electrolytic solution in the sealed container is preferably small, and dry air may be used for a gas to fill the space.

The above manufacturing method preferably includes a step of maintaining a battery obtained after injecting the electrolytic solution into the outer case at a temperature of 35° C. or higher and 60° C. or lower (preferably, 40° C. or higher and 60° C. or lower, more preferably 50° C. or higher and 60° C. or lower) for 48 hours or longer and shorter than 480 hours (or 480 hours or shorter). Then, a predetermined voltage is preferably applied to bring into a charging state. According to an exemplary embodiment, gas generation during such high temperature aging can be prevented. In addition, a step of degassing can be simplified or omitted.

The above manufacturing method is particularly effective if the thickness of the flexible film is 5 μm or larger and 150 μm or smaller.

A lithium ion secondary battery according to another exemplary embodiment is a lithium ion secondary battery including a positive electrode and a negative electrode disposed with a separator sandwiched therebetween and contained together with an electrolytic solution in an outer case including a flexible film, wherein the quantity of dissolved nitrogen in the electrolytic solution is 100 μg/mL or less.

The thickness of the flexible film is preferably 5 μm or larger and 150 μm or smaller.

A lithium ion secondary battery according to an exemplary embodiment can be obtained by using the above manufacturing method.

According to an exemplary embodiment, swelling, which is a problem inherent in a lithium ion secondary battery with an outer case including a flexible film, can be suppressed and in particular swelling under a high temperature environment can be suppressed.

Now, an exemplary embodiment will be further described.

Figure 1:
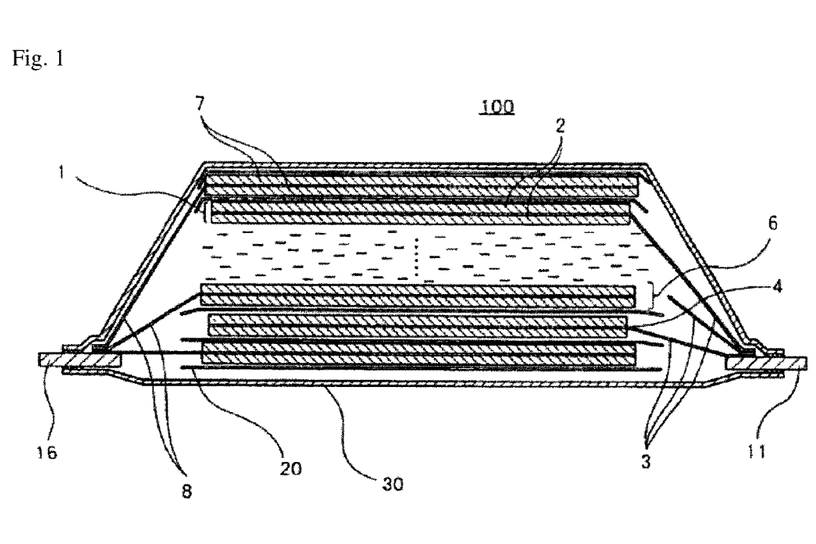
FIG. 1 is a schematic cross-sectional view to illustrate the inner structure of a laminate lithium ion secondary battery according to an exemplary embodiment.

FIG. 1 schematically illustrates an example of the configuration of a stacked lithium ion secondary battery, as a laminate lithium ion secondary battery according to an exemplary embodiment.

A lithium ion secondary battery 100 according to an exemplary embodiment includes an electrode laminate in which positive electrodes 1 and negative electrodes 6 are alternately laminated with a separator 20 sandwiched therebetween in a plurality of layers, and the electrode laminate is contained together with an electrolytic solution in an outer case (container) 30 including a flexible film. To the electrode laminate, a positive electrode terminal 11 and a negative electrode terminal 16 are electrically connected, and the end portion of each of the positive electrode terminal 11 and the negative electrode terminal 16 is partially or totally extracted to the outside of the outer case 30.

The positive electrode 1 includes a portion with a coating (positive electrode active material layer) 2, formed by applying a slurry containing a positive electrode active material onto the both sides of a positive electrode current collector followed by drying, and a portion with no coating, onto which the slurry has not been applied respectively. The negative electrode includes a portion with a coating (negative electrode active material layer) 7, formed by applying a slurry containing a negative electrode active material onto the both sides of a negative electrode current collector 8 followed by drying, and a portion with no coating, onto which the slurry has not been applied respectively.

The portion with no coating of a positive electrode active material on the positive electrode current collector serves as a positive electrode tab 3 to connect to the positive electrode terminal 11, and the portion with no coating of a negative electrode active material on the negative electrode current collector serves as a negative electrode tab 8 to connect to the negative electrode terminal 16. A plurality of the positive electrode tabs 3 are brought together onto the positive electrode terminal 11 and the positive electrode tabs 3 are connected to each other together with the positive electrode terminal 11 through ultrasonic welding or the like. A plurality of the negative electrode tabs 8 are brought together onto the negative electrode terminal 16 and the negative electrode tabs 8 are connected to each other together with the negative electrode terminal 16 through ultrasonic welding or the like. One end of the positive electrode terminal 11 connected to the positive electrode tabs 3 is extracted to the outside of the outer case 30, and one end of the negative electrode terminal 16 connected to the negative electrode tabs 8 is extracted to the outside of the outer case 30. In the boundary portion 4 between the portion with a coating of the positive electrode active material 2 and the portion with no coating of the positive electrode active material 2, an insulating member is formed to prevent a short circuit to the negative electrode terminal.

Examples of the positive electrode active material include layered oxide materials such as $LiCoO_2$, $LiNiO_2$, $LiNi_{1-x}Co_xO_2$, $LiNi_x(CoAl)_{1-x}O_2$, $Li_2MO_3$—$LiMO_2$ (M denotes metal element such as Ni, Co, and Mn), and $LiNi_{1/3}Co_{1/3}Mn_{1/3}O_2$; spinel-type oxide materials such as $LiMn_2O_4$, $LiMn_{1.5}Ni_{0.5}O_4$, and $LiMn_{2-x}M_xO_4$ (M denotes metal element such as Ni, Co, Cr, and Fe); olivine-type materials such as $LiMPO_4$ (M denotes, for example, Ni, Co, Fe, or Mn); fluorinated olivine-type materials such as $Li_2MPO_4F$ and $Li_2MSiO_4F$ (M denotes, for example, Ni, Co, Fe, or Mn); and vanadium oxide materials such as $V_2O_5$. One of these positive electrode active materials may be used singly, or two or more thereof may be used in a mixture. In the above compositional formulas, x denotes any positive integer.

Examples of the negative electrode active material which can be used include carbon materials such as graphite, amorphous carbon, diamond-like carbon, fullerene, carbon nanotubes, and carbon nanohorns; lithium metal materials; metal materials capable of alloying with Li such as silicon and tin; oxide materials such as $Nb_2O_5$ and $TiO_2$; and composites of them.

To each of the positive electrode active material and the negative electrode active material, a binder or a conductive aid, etc., may be appropriately added. Examples of the conductive aid include carbon black, carbon fibers, and graphite, and one of them may be used singly, or two or more thereof may be used in combination. For the binder, polyvinylidene fluoride, polytetrafluoroethylene, carboxymethyl cellulose, a modified acrylonitrile rubber particle, or the like may be used.

For the positive electrode current collector, aluminum, a stainless steel, nickel, titanium, or an alloy thereof may be used, and aluminum is particularly preferred. For the negative electrode current collector, copper, a stainless steel, nickel, titanium, or an alloy thereof may be used. Examples of the shape of the current collector include a foil, a sheet, and a mesh.

For the electrolytic solution, a nonaqueous electrolytic solution with a lithium salt dissolved therein may be used. Examples of the nonaqueous solvent include, but not particularly limited to, cyclic carbonates such as ethylene carbonate, propylene carbonate, vinylene carbonate, and butylene carbonate; linear carbonates such as ethyl methyl carbonate (EMC), diethyl carbonate (DEC), dimethyl carbonate (DMC), and dipropyl carbonate (DPC); aliphatic carboxylates such as methyl formate, methyl acetate, and ethyl propionate; lactones such as γ-butyrolactone; linear ethers such as 1,2-ethoxyethane (DEE) and ethoxymethoxyethane (EME); and cyclic ethers such as tetrahydrofuran and 2-methyltetrahydrofuran. Alternatively, an aprotic organic solvent may be used for the nonaqueous solvent, and examples of the aprotic organic solvent include dimethylsulfoxide, 1,3-dioxolane, dioxolane derivatives, formamide, acetamide, dimethylformamide, acetonitrile, propionitrile, nitromethane, ethyl monoglyme, triphosphates, trimethoxymethane, sulfolane, methylsulfolane, 1,3-dimethyl-2-imidazolidinone, 3-methyl-2-oxazolidinone, propylene carbonate derivatives, tetrahydrofuran derivatives, ethyl ether, 1,3-propanesultone, anisole, and N-methylpyrrolidone. One of the nonaqueous solvents may be used singly, or two or more thereof may be used in a mixture.

Examples of the lithium salt to be dissolved in the nonaqueous solvent include, but not particularly limited to, $LiPF_6$, $LiAsF_6$, $LiAlCl_4$, $LiClO_4$, $LiBF_4$, $LiSbF_6$, $LiCF_3SO_3$, $LiCF_3CO_2$, $Li(CF_3SO_2)_2$, $LiN(CF_3SO_2)_2$, and lithium bis(oxalate)borate. One of these lithium salts may be used singly, or two or more thereof may be used in combination. In addition, a polymer component may be contained as a nonaqueous electrolyte.

An additive may be added to the electrolytic solution. Examples of the additive which can be used include compounds having a sulfo group, fluorinated solvents such as fluoroethylene carbonate, and unsaturated cyclic carbonates such as vinylene carbonate. In particular, additives having low volatility, which are less affected by decompression, are preferred as the additive.

For the separator, a porous membrane, a woven fabric, a nonwoven fabric, or the like may be used. Examples of a material constituting the separator include polyolefin resins such as polypropylenes and polyethylenes, polyester resins, acrylic resins, styrenic resins, and nylon resins. In particular, polyolefin microporous membranes are preferred because of being excellent in ion conductivity and physical separation between a positive electrode and a negative electrode. Further, a layer containing an inorganic particle may be formed on the separator, as necessary. Examples of the inorganic particle include insulating oxides, nitrides, sulfides, and carbides, and among them, $TiO_2$ or $Al_2O_3$ is preferably contained.

For the container, an outer case including a flexible film, a can case with a small thickness, or the like may be used. An outer case including a flexible film is preferably used from the viewpoint of weight saving for a battery. The thickness of the flexible film is preferably 5 μm or larger and 150 μm or smaller. If the thickness is smaller than 5 μm, it is difficult to endure an impact from the outside and pressure increase in the case. The thickness is more preferably 10 μm or larger, and even more preferably 50 μm or larger from the viewpoint of achieving a sufficient strength, durability, etc. Although the case that the thickness is larger than 150 μm is advantageous in that swelling due to pressure increase in the case is suppressed, it is disadvantageous from the viewpoint of weight saving. For the flexible film, a film in which a resin layer is provided on each surface of a metal layer serving as a base material may be used. For the metal layer, a metal layer having barrier properties to prevent leakage of the electrolytic solution and moisture intrusion from the outside, for example, may be selected, and aluminum, a stainless steel, or the like may be used, and aluminum is particularly preferred. A heat-sealable resin layer of a modified polyolefin or the like is preferably provided on at least one surface of the metal layer. The electrode laminate is contained in such a way that the heat-sealable resin layers of the flexible film face each other, and the periphery of the portion containing the electrode laminate is heat-sealed, and thus an outer case can be formed. On the surface opposite to the surface with a heat-sealable resin layer formed thereon, a resin layer relatively excellent in heat resistance such as a nylon film and a polyester film may be provided.

A positive electrode terminal of aluminum or an aluminum alloy may be used for the positive electrode terminal, and a negative electrode terminal of copper, a copper alloy, or copper or a copper alloy with a nickel plating, or the like may be used for the negative electrode terminal. A heat-sealable resin may be provided in advance on each of the positive electrode terminal and the negative electrode terminal at a part corresponding to a portion of the flexible film to be heat-sealed when the electrode terminal is extracted to the outside of the outer case.

A polyimide, a glass fiber, a polyester, a polypropylene, or an insulating member including them in its structure may be used for the insulating member to be formed in the boundary portion between the portion with a coating of an active material and the portion with no coating of an active material, and the insulating member can be formed by heating a tape-shaped member to fuse on the boundary portion or by applying a gelled resin onto the boundary portion followed by drying.

Figure 2:
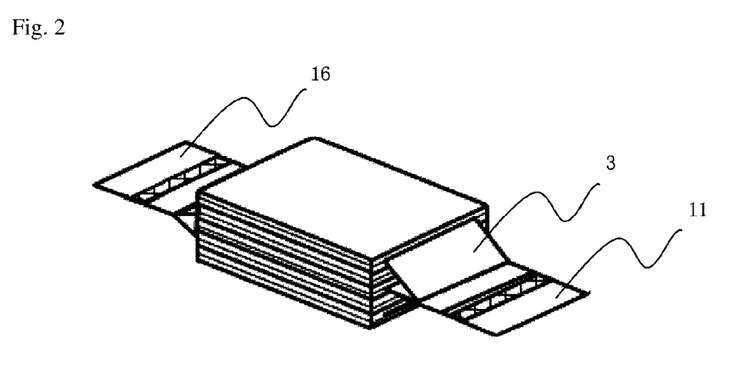
FIG. 2 is a schematic perspective view to illustrate a battery element of a laminate lithium ion secondary battery according to an exemplary embodiment.

FIG. 2 schematically illustrates a battery element (electrode laminate) in which a positive electrode and a negative electrode are repeatedly laminated with a separator sandwiched therebetween. The positive electrode tabs 3 are brought together and connected to the positive electrode terminal 11, and the negative electrode tabs 8 are brought together and connected to the negative electrode terminal 16, and a resin to strengthen the adhesion is formed in a portion of each terminal to contact with an outer case.

Figure 3:
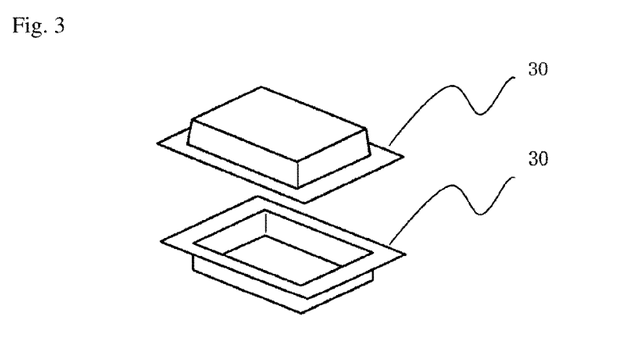
FIG. 3 is a schematic to illustrate an outer case of a laminate lithium ion secondary battery according to an exemplary embodiment.

FIG. 3 schematically illustrates an outer case to contain the battery element therein. Although an outer case obtained by pasting together two sheets each having a concave portion corresponding to the shape of the battery element is illustrated, the concave portion may be formed in only one sheet, or one sheet may be folded and pasted together.

Figure 4A:
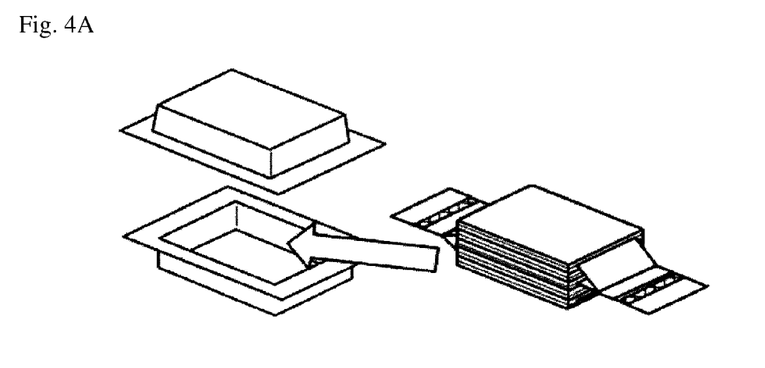
FIG. 4A is a schematic to illustrate how a battery element is contained in an outer case in manufacture of a laminate lithium ion secondary battery according to an exemplary embodiment.
Figure 4B:
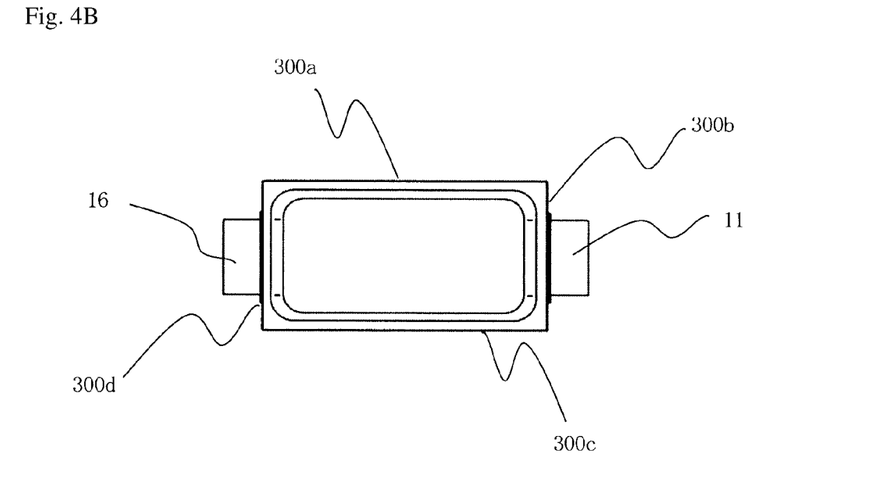
FIG. 4B is a schematic plan view of the laminate lithium ion secondary battery obtained in FIG. 4A.

As shown in FIG. 4A, the battery element is contained in the concave portions provided in the flexible films, and three peripheral edges are heat-sealed while any one edge among edges with no extrusion of an electrode terminal, for example, 300a in FIG. 4B, is left unsealed. The one edge left unfused is for injection of the electrolytic solution. As long as an area which allows for injection is left unfused in the one edge left unfused, the rest of the one edge may be fused.

After injection of the electrolytic solution, the portion left unfused is additionally heat-sealed to seal the outer case.

Figure 5A:
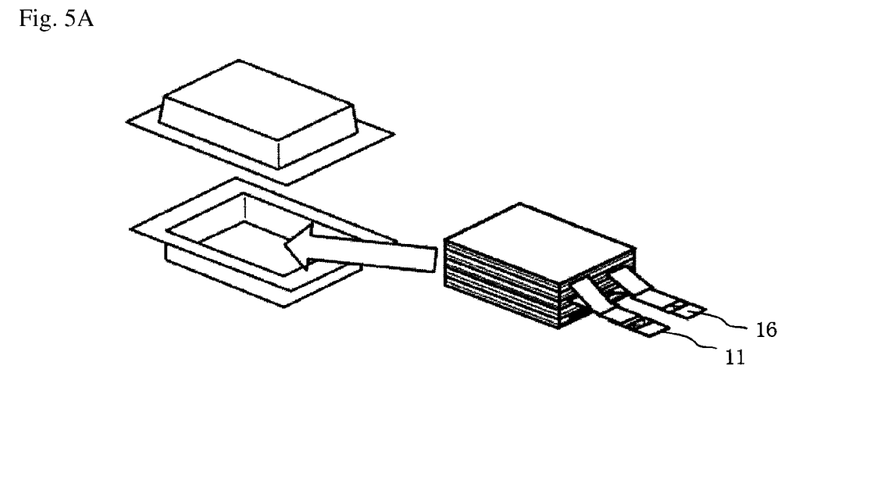
FIG. 5A is a schematic to illustrate how a battery element is contained in an outer case in manufacture of a laminate lithium ion secondary battery according to another exemplary embodiment.
Figure 5B:
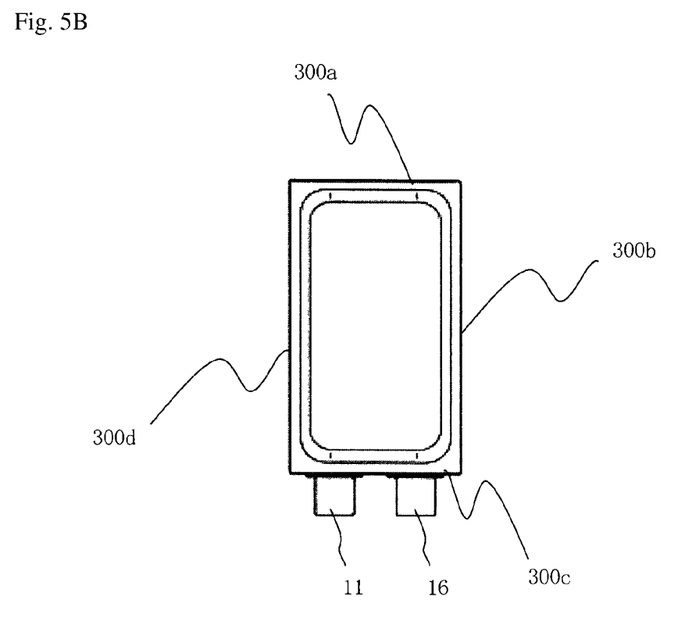
FIG. 5B is a schematic plan view of the laminate lithium ion secondary battery obtained in FIG. 5A.

Although a battery is formed in such a way that the electrode terminals are extracted from opposing edges in the example illustrated in FIG. 4A and FIG. 4B, a battery can be formed in the same manner in such a way that the electrode terminals are extracted from one edge as illustrated in FIG. 5A and FIG. 5B.

Subsequently, a resulting battery may be evaluated to determine whether the battery contains a foreign matter in the composite electrode material. By performing such evaluation and excluding batteries containing a foreign matter in the composite electrode material, a battery excellent in heat resistance can be provided. In the evaluation, a resulting battery is applied with a voltage at a high temperature, specifically, applied with a voltage at a temperature of 25° C. or higher and 60° C. or lower, preferably at a temperature of 35° C. or higher and 60° C. or lower, more preferably at a temperature of 40° C. or higher and 60° C. or lower, and is maintained in the state, for example, for 48 hours or longer and shorter than 480 hours (or 480 hours or shorter). Here, a short circuit occurs in a battery containing a metal foreign matter in the composite electrode material due to a needle-like precipitate of the metal foreign matter. Since such a short-circuited battery undergoes voltage drop due to self-discharge, batteries with voltage drop can be discriminated and excluded.

Here, voltage drop due to a foreign matter can be detected in a shorter time as the temperature is higher. If a battery does not swell even under such a temperature environment, the battery is proven to be a battery capable of operating satisfactorily even under a high temperature environment, for example, in a tropical region.

EXAMPLES

Examples 1 to 3

A mixed active material of $LiMn_2O_4$ and $LiNi_{0.8}Co_{0.1}Al_{0.1}O_2$ was used as a positive electrode active material, and carbon black as a conductive aid and polyvinylidene fluoride (PVdF) as a binder for positive electrodes were used. The positive electrode active material, conductive aid, and binder were dispersed in a solvent to prepare a slurry, and the slurry was applied onto a positive electrode current collector made of aluminum, dried, and pressed to obtain a positive electrode sheet of a predetermined size.

Graphite having an amorphous surface was used as a negative electrode active material, and PVdF was used as a binder for negative electrodes. The negative electrode active material and binder were dispersed in a solvent to prepare a slurry, and the slurry was applied onto a negative electrode current collector made of copper, dried, and pressed to obtain a negative electrode sheet of a predetermined size.

As described above with reference to FIGS. 1 to 4, the resultant positive electrode sheet 5 and negative electrode sheet 6 were laminated with a separator having a thickness of 25 μm and made of polypropylene sandwiched therebetween, and a negative electrode terminal and a positive electrode terminal were provided thereto, and the resultant was contained in an outer case made of a flexible aluminum laminate film (thickness: about 100 μm), and an electrolytic solution was injected thereinto and the outer case was sealed to obtain a stacked laminate battery.

The electrolytic solution used was an electrolytic solution obtained by adding a lithium salt ($LiPF_6$) and an additive (vinylene carbonate) to a mixed carbonate solvent containing ethylene carbonate and diethyl carbonate.

Here, before injection of the electrolytic solution, the electrolytic solution was subjected to decompression treatment with a vacuum pump in two steps at 25° C. each of which includes leaving to stand at a reduced pressure of −99 kPa relative to the atmospheric pressure (a pressure lower than the atmospheric pressure by 99 kPa) for 2 minutes followed by opening to the atmospheric pressure. The gas used in opening to the atmospheric pressure was dry air (dew point: −40° C. or lower). In this example, 200 to 1000 mL of the electrolytic solution was subjected to the decompression treatment.

Through the decompression treatment, the quantity of dissolved nitrogen in 1 mL of the electrolytic solution was controlled to 5 μmg.

Through changing the duration of leaving to stand after decompression (the duration between the opening to the atmospheric pressure after the second decompression and the injection) among the vacuuming conditions, the quantity of dissolved nitrogen in 1 mL of the electrolytic solution was controlled to 5 μg (Example 1), 35 μg (Example 2), 80 μg (Example 3), and 100 μg (Example 4).

The quantity of dissolved nitrogen in the electrolytic solution was measured by using gas chromatography (detector: ICD).

Comparative Example 1

A lithium ion secondary battery was produced in the same manner as in Examples except that the quantity of dissolved nitrogen in 1 mL of the electrolytic solution was controlled to 110 μg through changing the duration of leaving to stand after decompression among the vacuuming conditions in Examples.

Reference Example 1

A lithium ion secondary battery was produced in the same manner as in Examples except that the quantity of dissolved nitrogen in 1 mL of the electrolytic solution was controlled to 3 μg through changing the duration of leaving to stand after decompression among the vacuuming conditions in Examples.

(Evaluation)

Evaluations on the presence or absence of the swelling of the outer case and cycle characteristics were performed for the batteries obtained in Examples, Comparative Example, and Reference Example. Table 1 shows the results.

In the evaluation on the presence or absence of the swelling of the outer case, a battery was retained at a predetermined temperature (30° C., 45° C., 60° C.) for 240 hours and the presence or absence of the swelling of the outer case was determined by using Archimedes' Method.

In the evaluation on cycle characteristics, the capacity retention rate after 500 cycles relative to the initial capacity was determined, and a capacity retention rate of 90% or more was rated as "◯", a capacity retention rate of 85% or more and less than 90% was rated as "Δ", and a capacity retention rate of less than 85% was rated as "×".

TABLE 1

| | Quantity of dissolved N₂ [μg/mL] | Presence or absence of swelling (240 Hr) | | | Cycle characteristics (45° C., after 500 cycles) | Component analysis of electrolytic solution |
|---|---|---|---|---|---|---|
| | | 30° C. | 45° C. | 60° C. | | |
| Reference Example 1 | 3 | absent | absent | absent | X | reduction of solvent component |
| Example 1 | 5 | absent | absent | absent | ○ | no change |
| Example 2 | 35 | absent | absent | absent | ○ | no change |
| Example 3 | 80 | absent | absent | present | ○ | no change |
| Example 4 | 100 | absent | absent | present | Δ | no change |
| Comparative Example 1 | 110 | absent | present | present | Δ | no change |

As shown in Table 1, swelling did not occur at a temperature of 30 to 45° C. in the case that the quantity of dissolved N₂ was 100 μg/mL or less. In the case that the quantity of dissolved N₂ was 5 to 80 μg/mL (Examples 1 to 3), swelling did not occur at a temperature of 30 to 45° C. and in addition the cycle characteristics were satisfactory. In the case that the quantity of dissolved N₂ was 5 to 35 μg/mL (Examples 1 and 2), swelling did not occur even at 60° C. and in addition the cycle characteristics were satisfactory.

In the case that the quantity of dissolved N₂ was 3 μmg/mL (Reference Example 1), swelling did not occur, but the cycle characteristics were degraded. Although the reason is not clear, the degradation is presumably because the solvent in the electrolytic solution volatilized to increase the viscosity of the electrolytic solution and as a result the resistance increased. In the case that the quantity of dissolved N₂ was 110 μg/mL (Comparative Example 1), on the other hand, the outer case swelled due to aging at 45° C. or higher and the cycle characteristics were degraded.

In the foregoing, the present invention has been described with reference to the exemplary embodiments and the Examples; however, the present invention is not limited to the exemplary embodiments and the Examples. Various modifications understandable to those skilled in the art may be made to the constitution and details of the present invention within the scope thereof.

INDUSTRIAL APPLICABILITY

The present invention is useful for lithium ion secondary batteries, capacitor devices such as lithium ion capacitors, and methods for manufacturing them.

The present application claims the right of priority based on Japanese Patent Application No. 2014-199839 filed on Sep. 30, 2014, and Japanese Patent Application No. 2014-233944 filed on Nov. 18, 2014, the entire disclosures of which are incorporated herein.

REFERENCE SIGNS LIST

1 positive electrode
2 portion with coating of positive electrode active material
3 positive electrode tab
4 boundary portion
6 negative electrode
7 portion with coating of negative electrode active material
8 negative electrode tab
11 positive electrode terminal
16 negative electrode terminal
20 separator
30 outer case (flexible film)
100 lithium ion secondary battery

The invention claimed is:

1. A method for manufacturing a lithium ion secondary battery, the lithium ion secondary battery comprising a positive electrode and a negative electrode disposed with a separator sandwiched therebetween and contained together with an electrolytic solution in an outer case including a flexible film, wherein
a quantity of dissolved nitrogen in the electrolytic solution in injecting the electrolytic solution into the outer case is 100 μg/mL or less, the quantity being 5 μg/mL or more.

2. The method for manufacturing a lithium ion secondary battery according to claim 1, wherein the electrolytic solution is subjected to decompression treatment before injecting the electrolytic solution into the outer case so that a quantity of dissolved nitrogen in the electrolytic solution becomes 100 μg/mL or less, and the electrolytic solution after being subjected to the decompression treatment is injected into the outer case.

3. The method for manufacturing a lithium ion secondary battery according to claim 1, wherein a quantity of dissolved nitrogen in the electrolytic solution in injecting the electrolytic solution into the outer case is 10 μg/mL or more.

4. The method for manufacturing a lithium ion secondary battery according to claim 1, wherein a quantity of dissolved nitrogen in the electrolytic solution in injecting the electrolytic solution into the outer case is 80 μg/mL or less.

5. The method for manufacturing a lithium ion secondary battery according to claim 1, comprising a step of maintaining a battery obtained after injecting the electrolytic solution into the outer case, at a temperature of 35° C. or higher and 60° C. or lower for 48 hours or longer and shorter than 480 hours.

6. The method for manufacturing a lithium ion secondary battery according to claim 1, wherein a thickness of the flexible film is 5 μm or larger and 150 μm or smaller.

7. A method for manufacturing a lithium ion secondary battery, the lithium ion secondary battery comprising a positive electrode and a negative electrode disposed with a separator sandwiched therebetween and contained together with an electrolytic solution in an outer case including a flexible film, wherein
a quantity of dissolved nitrogen in the electrolytic solution in injecting the electrolytic solution into the outer case is 100 μg/mL or less, and
the method comprises a step of maintaining a battery obtained after injecting the electrolytic solution into the outer case, at a temperature of 35° C. or higher and 60° C. or lower for 48 hours or longer and shorter than 480 hours.

8. The method for manufacturing a lithium ion secondary battery according to claim 7, wherein the electrolytic solution is subjected to decompression treatment before injecting the electrolytic solution into the outer case so that a quantity of dissolved nitrogen in the electrolytic solution becomes 100 µg/mL or less, and the electrolytic solution after being subjected to the decompression treatment is injected into the outer case.

9. The method for manufacturing a lithium ion secondary battery according to claim 7, wherein a quantity of dissolved nitrogen in the electrolytic solution in injecting the electrolytic solution into the outer case is 80 µg/mL or less.

10. The method for manufacturing a lithium ion secondary battery according to claim 7, wherein a thickness of the flexible film is 5 µm or larger and 150 µm or smaller.

* * * * *

UNITED STATES PATENT AND TRADEMARK OFFICE
CERTIFICATE OF CORRECTION

PATENT NO. : 10,193,184 B2
APPLICATION NO. : 15/506573
DATED : January 29, 2019
INVENTOR(S) : Tomoyuki Ohta, Ryota Yanagisawa and Takayuki Suzuki It is certified that error appears in the above-identified patent and that said Letters Patent is hereby corrected as shown below:

In the Specification

Column 10, Description of Embodiments, Line 17: Delete "µmg." and insert --µg.-- therefor Column 11, Description of Embodiments, Line 26: Delete "µmg/mL" and insert --µg/mL-- therefor Signed and Sealed this
Fourth Day of June, 2019

Andrei Iancu
*Director of the United States Patent and Trademark Office*